No. 613,018. Patented Oct. 25, 1898.
E. B. W. REICHEL.
RUNNING GEAR FOR MOTOR VEHICLES.
(Application filed May 7, 1898.)

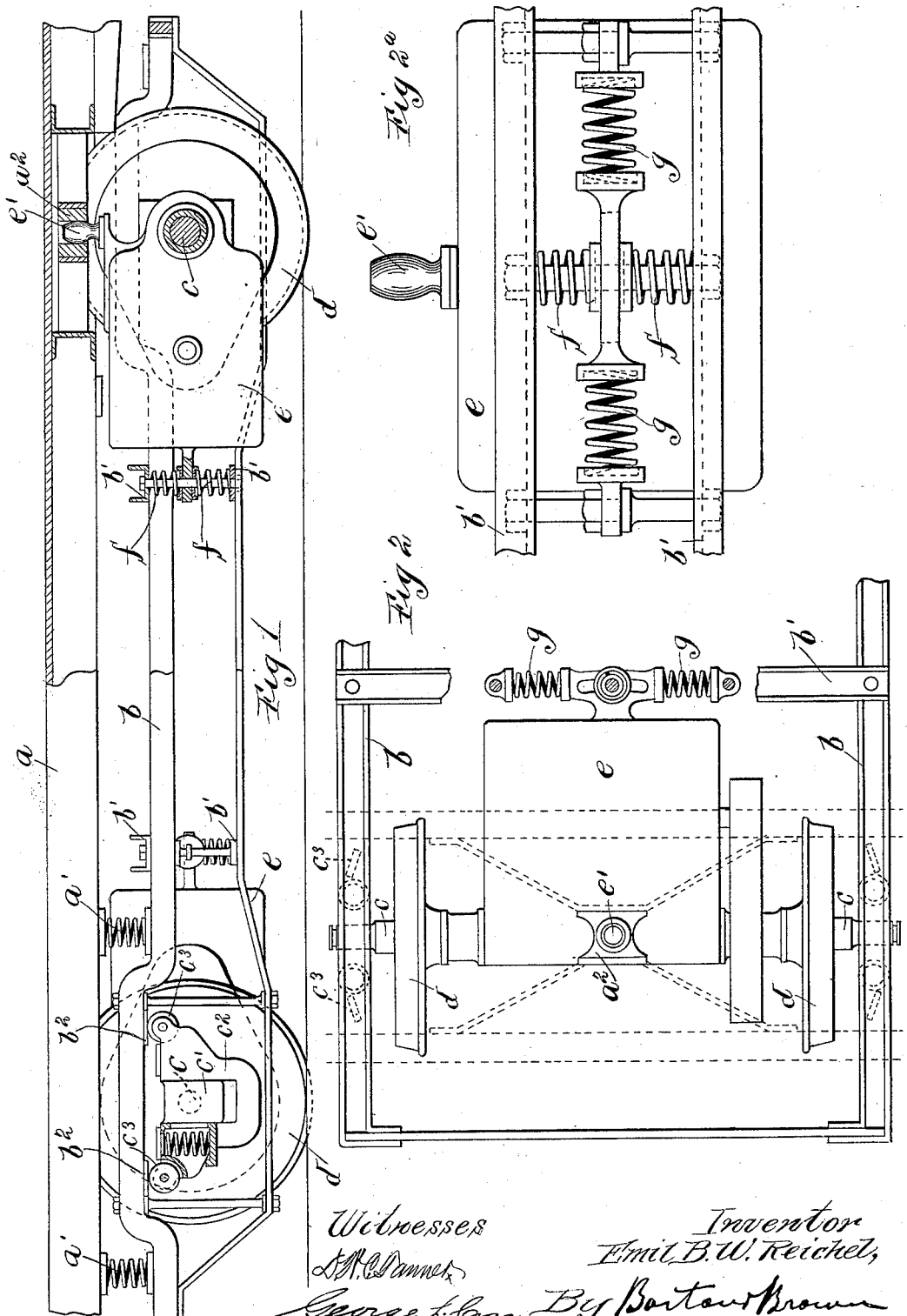

(No Model.) 3 Sheets—Sheet 2.

Witnesses:
Inventor,
Emil B. W. Reichel,
By Baitant Brown
Attorneys

THE NORRIS PETERS CO., PHOTO-LITHO., WASHINGTON, D. C.

No. 613,018. Patented Oct. 25, 1898.
E. B. W. REICHEL.
RUNNING GEAR FOR MOTOR VEHICLES.
(Application filed May 7, 1898.)
(No Model.) 3 Sheets—Sheet 3.
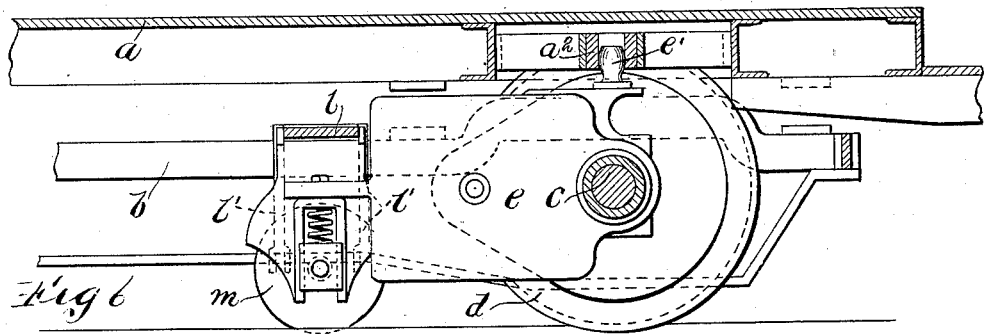
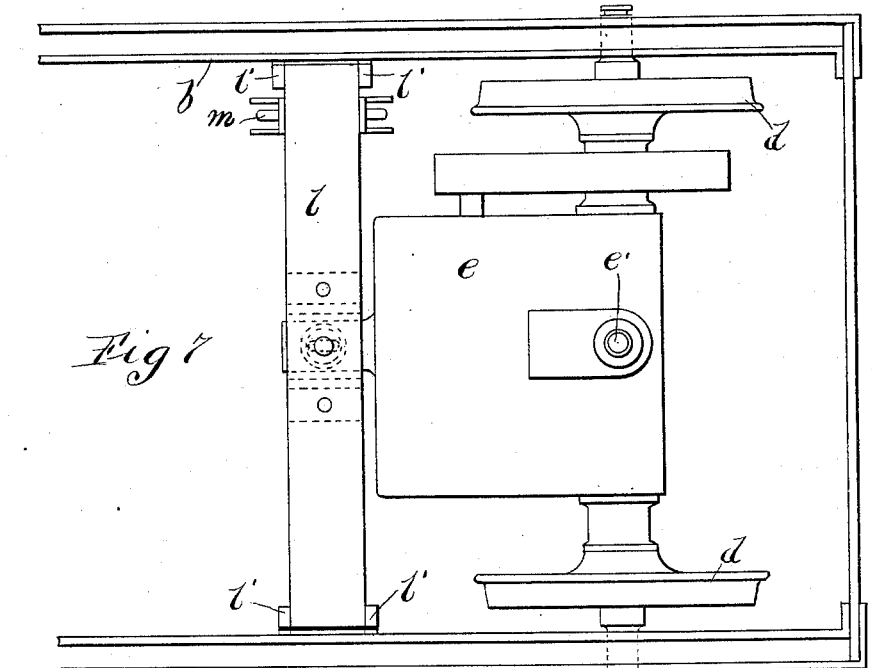
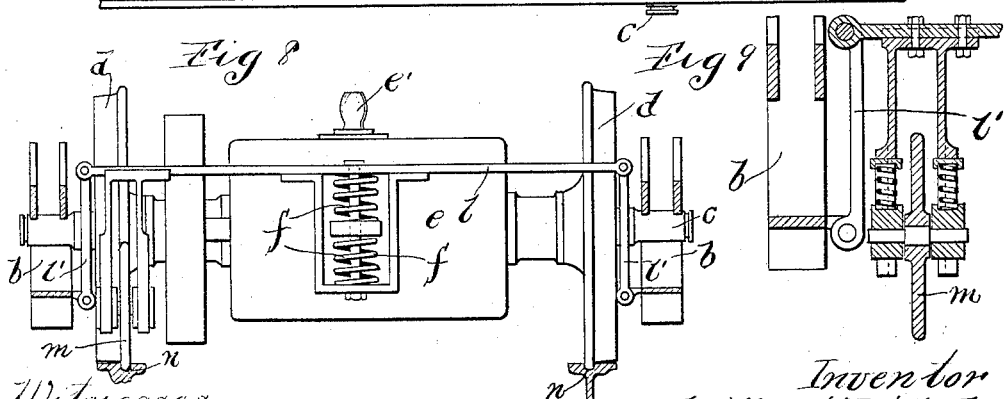
Witnesses
Inventor
Emil B. W. Reichel,
By Barton & Brown,
Attorneys.
THE NORRIS PETERS CO., PHOTO-LITHO., WASHINGTON, D. C.

UNITED STATES PATENT OFFICE.

EMIL BERTHOLD WALTER REICHEL, OF BERLIN, GERMANY, ASSIGNOR TO THE SIEMENS & HALSKE ELECTRIC COMPANY OF AMERICA, OF CHICAGO, ILLINOIS.

RUNNING-GEAR FOR MOTOR-VEHICLES.

SPECIFICATION forming part of Letters Patent No. 613,018, dated October 25, 1898.

Application filed May 7, 1898. Serial No. 680,007. (No model.)

*To all whom it may concern:*

Be it known that I, EMIL BERTHOLD WALTER REICHEL, a subject of the Emperor of Germany, residing at Berlin, Germany, have invented a certain new and useful Improvement in Running-Gear for Motor-Vehicles, (Case No. 147,) of which the following is a full, clear, concise, and exact description.

This invention relates to running-gear for motor-vehicles, and is designed more especially to be applied to the driving-axles of electric street-railway cars.

Heretofore the sharpest curve on the line of a street-railway has determined the length of the wheel-base of the cars used thereon when such cars are of ordinary construction—that is, having one truck-frame with an axle at each end. If it became necessary to increase the size of the cars, then pivotally-mounted trucks were required at each end of the car. Street-railway cars of this kind are expensive both as regards first cost and the frequent repairs which are required. It has been proposed to employ many small motors in such cases coupled to the axles of a pivotally-mounted truck; but this expedient is obviously impracticable.

In accordance with the present invention the truck is solidly and stationarily mounted with relation to the car. The axles are not rigidly mounted in the truck, but are capable of movement in a horizontal plane about a pivot, the weight of the car, however, not being sustained by such pivot, but by the truck itself.

A more detailed description of this invention will be given and the salient features thereof more easily pointed out by reference to the accompanying drawings, in which—

Figure 3:
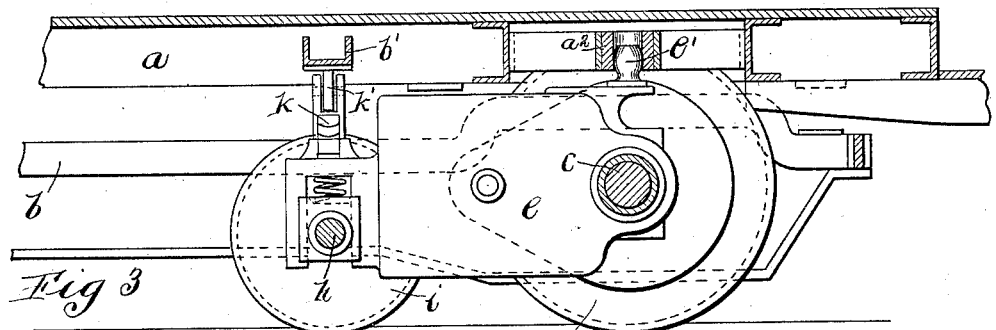
Figure 4:
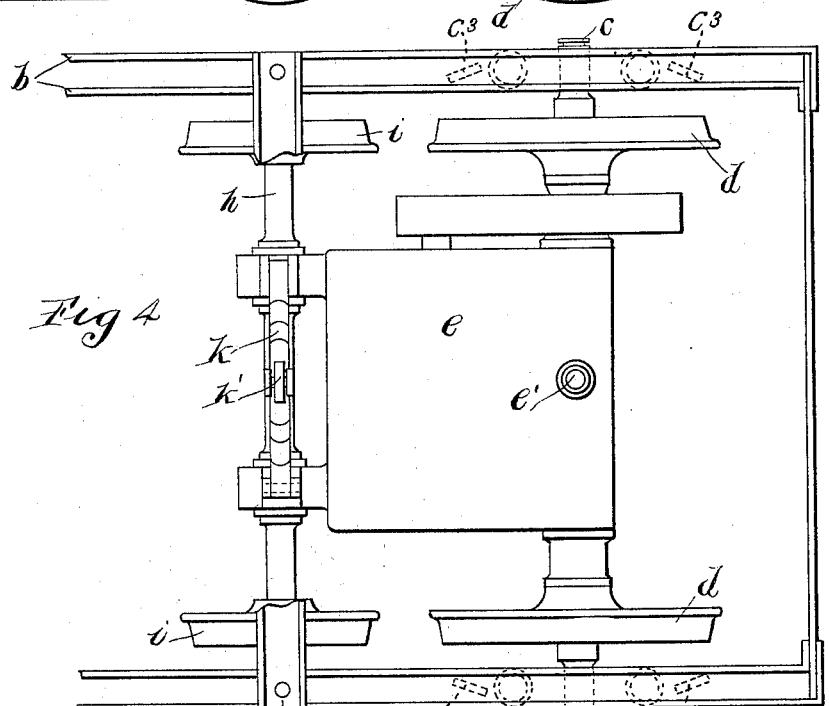
Figure 5:
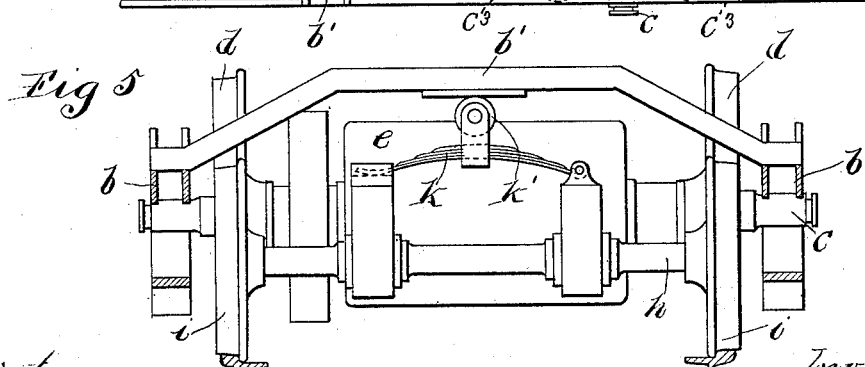

Figure 1 is a view in elevation, partly sectional, of a truck for electric street-railway cars embodying my invention. Fig. 2 is a plan view thereof. Fig. 2ª is a detail view of an adjustable spring-mounting for one end of the motor entering into the construction of the device illustrated in Figs. 1 and 2. Fig. 3 is a sectional elevation showing one end of a car-truck of slightly different construction. Figs. 4 and 5 are respectively plan and end views of the same. Fig. 6 is a sectional elevation of one end of a car-truck of modified form. Figs. 7 and 8 are respectively plan and end views thereof, while Fig. 9 shows a portion of the mechanism in detail.

Corresponding parts have been designated by the same letter of reference throughout the drawings.

The car $a$ is supported upon the truck-frame $b$ by springs $a'$ $a'$, as illustrated in Fig. 1, the truck being rigid and immovable, except in a vertical direction by the elasticity of the springs. The axles $c$ $c$, upon which the wheels $d$ $d$ are mounted, are located at each end of the truck-frame, the mounting of said axles and the arrangement of parts associated therewith constituting the essence of the present invention.

The motor casing or support $e$ is mounted at one end upon the axle $c$ in the usual manner; but a pivot $e'$ is cast upon the upper part thereof directly over the center of the axle and resting within a socket $a^2$, provided in the base-frame of the car. As shown in Fig. 1, the other end of the motor is supported upon vertical springs $f$ $f$, supported by the cross-girders $b'$ $b'$ of the truck-frame, horizontal springs $g$ $g$ being arranged to keep the motor normally from horizontal movement about the pivot $e'$, said springs being sufficiently elastic, however, to accommodate themselves to the horizontal swinging of the motor about the pivot $e'$ when the car is rounding curves.

In order to provide for lateral movement of the ends of the axle as the same swings about the pivot $e'$ and as well to support the weight of the truck and car upon such axle, some such arrangement as that shown at the left in Fig. 1 may be employed. As therein illustrated, the journal $c'$ is embraced by a spring-mounted rider $c^2$, which carries rollers $c^3$, engaging with a track portion $b^2$ of the truck-frame. It will be readily understood how this peculiar mounting of the axle and motor will cause them to act when the car strikes a curve. The wheels instead of slipping and grating along the track, wearing out the latter and in some instances becoming derailed, will adjust themselves automatically to the curve, the axles taking up a position radially to such curve. The weight of the car will be sustained by the truck, which rests upon the adjustable journals, while the pivot will receive only the horizontal thrust.

In Figs. 3, 4, and 5 the end of the motor-frame *e* instead of being secured to the cross-girder is supported upon a supplementary axle *h*, carrying the pair of wheels *i i*, which serve positively to lead the main wheels into a substantially radial position. In order to prevent the supplemental wheels *i i* from becoming accidentally derailed, as upon a sudden starting or stopping of the motor, a spring-mounted rider *k* is provided on that end of the motor, which rider engages by means of a roller *k'* with the cross-girder *b'* of the truck-frame.

Figs. 6, 7, 8, and 9 illustrate a modification of my invention wherein the end of the motor-frame which is not mounted upon the axle is supported by means of vertical springs *f f* upon a swinging cross-girder *l*, connected by means of links *l' l'* with the truck-frame *b*, while a guide-wheel *m*, running in a groove *n* of the track, serves to adjust the position of said swinging cross-girder, and thereby of the motor *e* and axle *c*, to cause said axle to maintain a position at right angles with a straight track or radially to a curve. It may be convenient in some instances to employ such guide-wheel or a sliding shoe similarly mounted as a current-collector, and it might in such cases travel along an independent or third rail.

Having thus described my invention, I claim as new, and desire to secure by Letters Patent, together with all such modifications as may be made with mere skill, the following:

1. The combination with a car-truck frame, of an axle upon which the driving-wheels are mounted, a motor fixedly supported at one end upon said axle, and adjustable in a horizontal plane at the other end, a pivotal mounting about which said axle may swing in a horizontal plane, a movable connection between the journals of said axle and the frame of the truck, and means connected with the motor-frame for adjusting the position of said axle with relation to the truck-frame to compensate for curves in the track over which the car may travel, whereby the axle may be kept substantially at right angles to a straight track and adjusted substantially radially to a curved track, substantially as described.

2. The combination with a truck-frame for self-propelled cars, of an axle upon which the driving-wheels are mounted, a motor, the frame whereof is connected at one end with said axle, a pivotal connection between the truck-frame and axle, a movable connection between the journals of said axle and the truck-frame, whereby the weight of the latter is sustained by said journals while permitting them and the axle to swing about said pivot, an adjustable support for the other end of said motor-frame to permit movement thereof in a horizontal plane to compensate for the swinging of said axle and the motor-frame mounted thereon about said pivotal connection, and a guiding-wheel connected with the motor and axle and arranged to travel along the track, for automatically shifting said axle and motor about said pivotal connection to compensate for curves in the track over which the car may travel, substantially as described.

3. The combination with a truck-frame for self-propelled vehicles, of an axle upon which the driving-wheels are mounted, a pivotal connection between said truck-frame and axle, journals for said axle adapted to support the weight of the truck and car but movable in a horizontal plane about said pivotal connection, a motor supported at one end upon said axle and movable horizontally therewith, and a guide connected with the other end of the motor-frame and adapted to swing the axle and motor together about said pivot to compensate for curves in the track along which the car travels, substantially as described.

4. The combination with a car-truck frame, of an axle and driving-wheels carried thereby, a motor supported at one end upon said axle and geared thereto to drive the same, a pivotal connection between the motor and the car-truck frame, about which the motor and axle may swing in a horizontal plane, an adjustable support or mounting for the other end of the motor to permit the lateral movement thereof, journals at the ends of the axle for sustaining the weight of the truck, and a mounting for said journals permitting them to be moved in a horizontal plane as the motor and axle swing about said pivotal connection, substantially as set forth.

5. The combination with a truck-frame, of an axle and driving-wheels carried thereby, a motor supported at one end upon said axle and geared thereto to drive the same, a pivotal mounting about which the motor and axle may swing in a horizontal plane, journals at the ends of said axle for sustaining the weight of the truck, said journals being movably mounted to permit them to swing horizontally with the axle, an adjustable support for the other end of the motor permitting the same to swing in a horizontal plane, and springs associated with such support, for yieldingly maintaining that end of the motor in a central position, substantially as described.

In witness whereof I hereunto subscribe my name this 29th day of March, A. D. 1898.

EMIL BERTHOLD WALTER REICHEL.

Witnesses:
 HENRY HASPER,
 C. H. DAY.